C. R. BURR & J. V. R. TOWERS.
Cuspadores for Cars and other Vehicles.

No. 198,273. Patented Dec. 18, 1877.

UNITED STATES PATENT OFFICE.

CHARLES R. BURR AND JOHN V. R. TOWERS, OF WASHINGTON, D. C.

IMPROVEMENT IN CUSPADORES FOR CARS AND OTHER VEHICLES.

Specification forming part of Letters Patent No. 198,273, dated December 18, 1877; application filed December 8, 1877.

*To all whom it may concern:*

Figure 1:
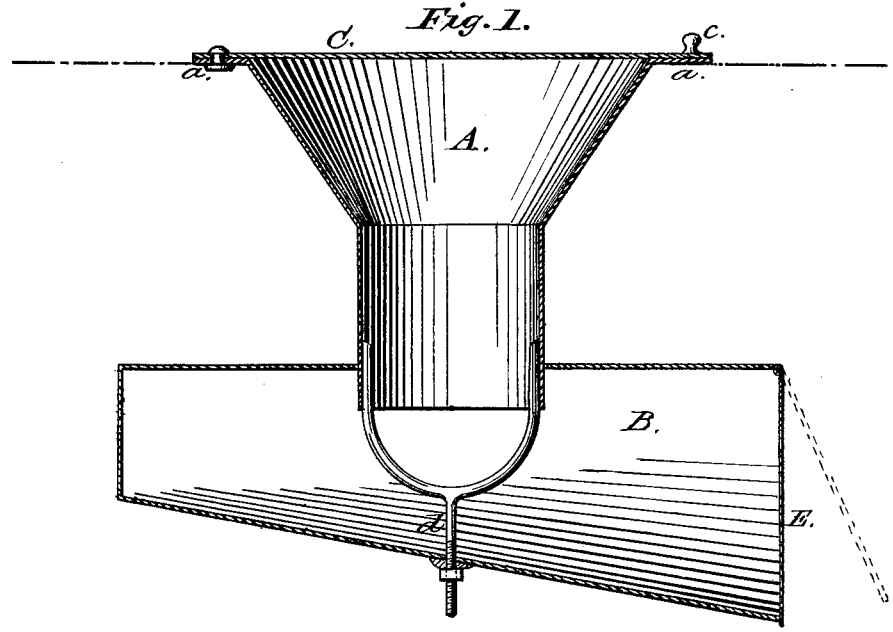
Figure 2:
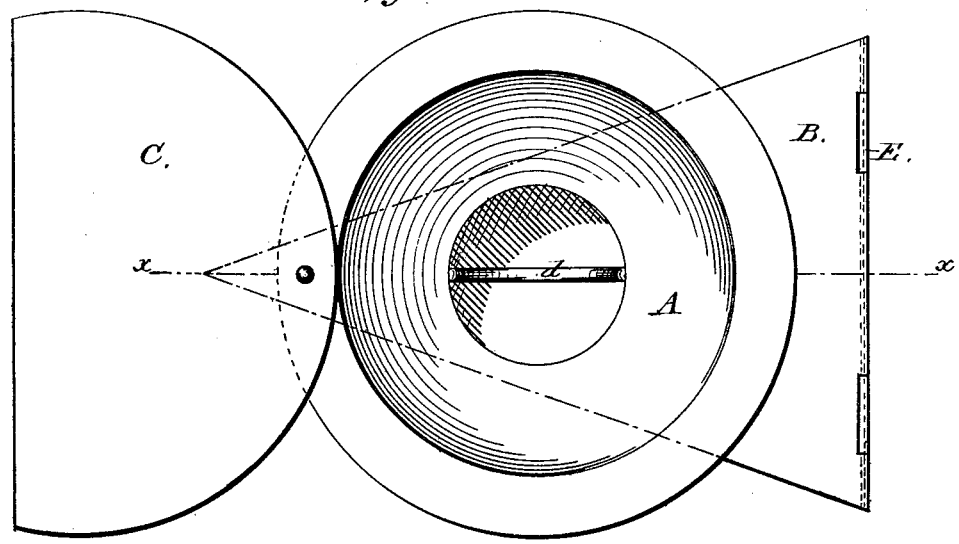
Figure 3:
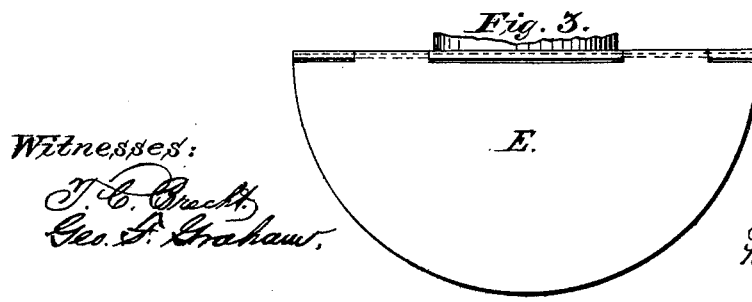

Be it known that we, CHARLES R. BURR and JOHN V. R. TOWERS, both of Washington city, in the District of Columbia, have invented a new and useful Improvement in Cuspadores for Railroad-Cars and other Vehicles, of which the following is a specification:

In the accompanying drawings, Figure 1 is a longitudinal vertical section of our device through the line $x\ x$, Fig. 2. Fig. 2 is a plan view, with the cover shown at one side; and Fig. 3 is an end view of the lower receptacle.

The object of our invention is to provide a cheap and easily-cleansed cuspadore for railroad-cars and other vehicles; and it consists of an upper funnel-shaped section secured to the floor of a car or other vehicle, to which a lower revolving section is attached, all of which will be more fully and definitely described hereinafter.

In the drawing the upper section A is made conical or funnel shaped, with a flanged rim, $a$, and it also has a pivoted cover, C, with a lug or handle, $c$. The lower section B is nearly of a semiconical shape, having its apex laterally projected, forming a sharp edge extending from the apex.

A hole being cut in the floor of the car or other vehicle, section A is put in position with its top set flush with the floor, and resting upon the flanged rim $a$; the lower portion passes down below the floor and enters a round hole cut in the upper or flat surface of section B. Near the lower extremity, and firmly attached to the sides of section A, is a rod, $d$, the upper part forming a semicircle. This rod extends down and through section B, thus joining the two sections together, and holding them in position by means of a nut or key on the end of the rod, but leaving sufficient space for section B to revolve at will underneath the floor of the car or vehicle.

The apex of section B is always toward the forward end of the car or vehicle when it is in motion, and it being loosely connected, revolves around on rod $d$, no matter in what direction the car or vehicle may be moving.

The bottom of section B being greatly inclined from the apex allows spittle and other things deposited in section A to pass out at the lower opening or gate E. This gate is hinged in the ordinary manner, and is intended to swing loosely on its hinges, but to set close to the opening, so as to prevent the entrance or influx of air up through the sections, and thence into the body of the car or vehicle.

Having fully described our invention, what we claim, and desire to secure by Letters Patent, is—

1. The cuspadore herein described, consisting of an upper funnel-shaped section, A, and a lower loosely revolving section, B, substantially as shown and described.

2. The combination of the conical or funnel-shaped section A, with the flanged rim $a$ and semi-conical-shaped section B, the connecting semicircular rod $d$, and gate E, arranged and operating substantially as set forth and described.

In testimony whereof we have hereunto subscribed our names.

CHAS. R. BURR.
JOHN V. R. TOWERS.

Witnesses:
JOS. S. STETTINIUS,
H. C. SISSON.